United States Patent
Vermeulen et al.

(10) Patent No.: US 9,484,028 B2
(45) Date of Patent: Nov. 1, 2016

(54) SYSTEMS AND METHODS FOR HANDS-FREE VOICE CONTROL AND VOICE SEARCH

(71) Applicant: Sensory, Incorporated, Santa Clara, CA (US)

(72) Inventors: Pieter J. Vermeulen, Portland, OR (US); Jonathan Shaw, Oregon City, OR (US); Todd F. Mozer, Los Altos Hills, CA (US)

(73) Assignee: Sensory, Incorporated, Santa Clara, CA (US)

(*) Notice: Subject to any disclaimer, the term of this patent is extended or adjusted under 35 U.S.C. 154(b) by 270 days.

(21) Appl. No.: 14/184,306

(22) Filed: Feb. 19, 2014

(65) Prior Publication Data

US 2014/0180691 A1   Jun. 26, 2014

Related U.S. Application Data

(63) Continuation of application No. 12/831,051, filed on Jul. 6, 2010.

(60) Provisional application No. 61/223,172, filed on Jul. 6, 2009.

(51) Int. Cl.
| | |
|---|---|
| *G10L 15/00* | (2013.01) |
| *G10L 15/08* | (2006.01) |
| *G10L 15/22* | (2006.01) |
| *G10L 15/32* | (2013.01) |

(52) U.S. Cl.
CPC .............. *G10L 15/22* (2013.01); *G10L 15/32* (2013.01); *G10L 2015/081* (2013.01); *G10L 2015/088* (2013.01)

(58) Field of Classification Search
CPC .............. G10L 15/32; G10L 2015/81; G10L 2015/088
USPC ................ 704/231, 236, 242, 248, 251, 254
See application file for complete search history.

(56) References Cited

U.S. PATENT DOCUMENTS

| | | | |
|---|---|---|---|
| 4,918,731 A | 4/1990 | Muroi | |
| 5,425,129 A | 6/1995 | Garman et al. | |
| 5,450,525 A * | 9/1995 | Russell et al. | ................ 704/275 |
| 5,457,768 A | 10/1995 | Tsuboi et al. | |
| 5,566,270 A | 10/1996 | Albesano et al. | |
| 5,598,507 A | 1/1997 | Kimber et al. | |
| 5,621,849 A | 4/1997 | Sakurai et al. | |
| 5,621,859 A | 4/1997 | Schwartz et al. | |
| 5,822,730 A | 10/1998 | Roth et al. | |

(Continued)

OTHER PUBLICATIONS

Rohlicek, Jan Robin. "Word spotting." Modern Methods of Speech Processing. Springer US, 1995. pp. 123-157.*

(Continued)

*Primary Examiner* — James Wozniak
(74) *Attorney, Agent, or Firm* — Fountainhead Law Group P.C.

(57) ABSTRACT

In one embodiment the present invention includes a method comprising receiving an acoustic input signal and processing the acoustic input signal with a plurality of acoustic recognition processes configured to recognize the same target sound. Different acoustic recognition processes start processing different segments of the acoustic input signal at different time points in the acoustic input signal. In one embodiment, initial states in the recognition processes may be configured on each time step.

17 Claims, 9 Drawing Sheets

(56) References Cited

U.S. PATENT DOCUMENTS

| | | | |
|---|---|---|---|
| 5,950,159 | A | 9/1999 | Knill |
| 6,006,185 | A | 12/1999 | Immarco |
| 6,061,652 | A | 5/2000 | Tsuboka et al. |
| 6,076,056 | A | 6/2000 | Huang et al. |
| 6,230,126 | B1 | 5/2001 | Kuroda |
| 6,275,801 | B1 | 8/2001 | Novak et al. |
| 6,493,670 | B1* | 12/2002 | Croft .............. 704/270 |
| 6,757,652 | B1 | 6/2004 | Lund et al. |
| 6,879,954 | B2 | 4/2005 | Nguyen et al. |
| 6,985,859 | B2 | 1/2006 | Morin |
| 7,016,836 | B1 | 3/2006 | Yoda |
| 7,650,282 | B1 | 1/2010 | Morris |
| 7,720,683 | B1 | 5/2010 | Vermeulen et al. |
| 7,991,614 | B2 | 8/2011 | Washio et al. |
| 2004/0006470 | A1 | 1/2004 | Kobayashi |
| 2004/0162727 | A1 | 8/2004 | Kiuchi et al. |
| 2006/0080086 | A1 | 4/2006 | Iliev et al. |
| 2007/0050190 | A1 | 3/2007 | Washio et al. |

OTHER PUBLICATIONS

I. Szoke, et al.; "Comparison of Keyword Spotting Approaches for Informal Continuous Speech," In: Proc. of Joint Workshop on Multimodal Interaction and Related Machine Learning Algorithms; 4 pages; 2005.

J. Junkawitsch, et al.; "A New Keyword Spotting Algorithm with Pre-Calculated Optimal Thresholds", ICSLP 96, Philadelphia; 4 pages; 1996.

H. Ketabdar, et al., "Posterior Based Keyword Spotting with a Priori Thresholds", Published in ICSLP'06; 4 pages; 2006.

M. Wollmer, et al., "Robust Discriminative Keyword Spotting for Emotionally Colored Spontaneous Speech Using Bidirectional LSTM Networks", IEEE International Conference on Acoustic, Speech, and Signal Processing; 4 pages; 2009.

G. White, "Dynamic Programming, the Viterbi Algorithm, and Low Cost Speech Recognition", Acoustics, Speech and Signal Processing, IEEE International Conference on ICASSP; vol. 3; 5 pages; 1978.

Bou-Ghazale, et al.; "Hands-Free Voice Activation of Personal Communication Devices", Acoustics, Speech and Signal Processing, ICASSP Proceedings; vol. 3; 4 pages; 2000.

Princippi, et al.; "Keyword Spotting Based System for Conversation Fostering in Tabletop Scenarios: Preliminary Evaluation", Human System Interactions, HSI'09, 2nd Conference on IEEE; 4 pages; 2009.

U.S. Appl. No. 12/831,051, filed Jul. 6, 2010.

* cited by examiner for each s ∈ S
 $\delta_{0,s} = -\infty$   }~501 for t = 0 to N - 1
 foreach i ∈ I
  if $\delta_{t,i} < P_i$
   $\delta_{t,i} = P_i$   ~504   ~503 foreach s ∈ S
506 ~  $\delta_{t,s} = \log(p_{t,s}) + \max_{s' \in T_s}(\delta_{t-1,s'}) + G_s$
507 ~  $f_{t,s} = \text{argmax}_{s' \in T_s}(\delta_{t-1,s'})$
509 ~  if s ∈ F and $\delta_{t,s} > 0$
  510 ~ $result_t = s$
  511 ~ for T = t - 1 downto 0
   512 ~ $result_T = f_{T+1, result\ T+1}$
  513 ~ return $result$, $\delta_{t,s}$, t return null 502, 505, 508

*Fig. 5*

SYSTEMS AND METHODS FOR HANDS-FREE VOICE CONTROL AND VOICE SEARCH

CROSS REFERENCE TO RELATED APPLICATIONS

This application is a continuation of U.S. patent application Ser. No. 12/831,051, filed Jul. 6, 2010, now U.S. Pat. No. 8,700,399, issued Apr. 15, 2014, which claims the benefit of U.S. Provisional Patent Application No. 61/223,172, filed Jul. 6, 2009, the entire disclosures of which are incorporated herein by reference for all purposes.

BACKGROUND

The present invention relates to speech recognition, and in particular, to systems and methods for word spotting in speech recognition to create hands-free control of consumer and other electronics products.

Speech recognition systems are used to recognize acoustic inputs, such as spoken words or phrases, for example. Consumer electronic devices have begun embracing speech recognition as a means to command and control the product. Some products such as Bluetooth Headsets with speech interfaces, utilize a voice user interface (VUI) to interact with the product. However, such consumer electronic speech recognition products always require a button press to trigger the recognizer.

It is desirable to have a completely hands-free approach to trigger the recognizer to listen. This would require the recognizer to be on and listening to all spoken words in its environment for that single trigger word that activates the recognizer to begin listening for words to recognize and understand. Several voice activated light switch products have come to market, but the performance was never acceptable to enable mass volumes.

Hands-free voice triggers can make two types of errors. They cannot recognize the right command (false reject), or they can mis-recognize the wrong command (false accept). Speech recognition technologies can make tradeoffs between the false accept and false reject rate, but speech technologies for consumer products have generally been unable to reach a happy medium that is acceptable to users.

The hands-free voice trigger technology has been particularly difficult to master because it must work in noisy home environments (e.g. tv on, people talking, music playing, babies screaming, etc.), and while the noise is loud, the listening device is often quite far from the user, creating a very low S/N ratio.

Some prior art techniques perform speech recognition for an internet appliance using a remotely located speech recognition application. For example, speech recognition may be performed on a server, which is accessed through storing and sending the voice data. It assumes it is not cost effective to have the speech recognizer embedded in the consumer device for cost reasons. This approach thus requires some sort of manual request for internet access or recording the speech to transmit over the internet, and therefore cannot create truly hands-free devices.

In some speech recognition systems, acoustic inputs may be processed against acoustic models of sounds to determine which sounds are in the acoustic input. FIG. 1 illustrates prior art approaches to speech recognition. In FIG. 1, the acoustic input 101 in the top row is illustrated as silence ("sil") followed by the sound "yi ye yes m". In this example, it may be desirable for the recognizer to recognize "yes"— the target sound. According to one existing approach for performing recognition, a recognizer is configured with a model (or grammar) that indicates what sounds to recognize. For example, the word to be recognized may be modeled at 102 as "sil" followed by the sounds "y" and "e" and "s" and ending in "sil" (i.e., "yes"). This is referred to as a non-word spotting approach. However, this approach may not provide satisfactory results. As the recognition process receives the acoustic input, it listens for "y", "e", "s" and tries to line up the received sounds with the sounds it is looking for as it attempts to recognize the target sound. As this example illustrates, the recognizer may be misled by the input signal and may improperly classify the received sounds, which may result in a very low confidence in the final recognized result, or no recognized result at all. In FIG. 1, the backslash lines represent low confidence recognition, the vertical lines represent moderate confidence recognition, and the forward-slash lines represent high confidence recognition. A recognition process using model 102 may have very low confidence results, with only the "s" being recognized with high confidence, for example.

One approach for recognizing sounds buried in other sounds is referred to as word spotting. In a typical word spotting recognition process, the target sound may be modeled as any sound (or background sounds, "any") followed by "y" and "e" and "s" and ending in "any". One challenge with this approach is building an accurate background model for "any". However, creating an accurate background model may require a model that covers many sounds, including noise, silence, and many spoken sounds, for example. As illustrated in FIG. 1, the background model "any" may perform poorly, and when the target word is spoken (here, "yes") it may only be recognized with moderate confidence.

Accordingly, it would be advantageous to have a recognition system and method for more accurately performing word spotting recognition.

SUMMARY

Embodiments of the present invention include systems and methods for acoustic recognition. In one embodiment, the present invention includes a method comprising receiving an acoustic input signal and processing the acoustic input signal with a plurality of acoustic recognition processes configured to recognize the same target sound, wherein different acoustic recognition processes start processing different segments of the acoustic input signal at different time points in the acoustic input signal.

In one embodiment, each acoustic recognition process generates a score, and wherein said word or phrase is recognized if at least one of said acoustic recognition processes has a score greater than a threshold when said at least one of said acoustic recognition processes is in a final state.

In one embodiment, the acoustic input signal is processed across a plurality of time steps, and wherein different acoustic recognition processes are started at successive time steps.

In one embodiment, each acoustic recognition process comprises a plurality of states corresponding to acoustic units, each state having an associated score.

In one embodiment, each acoustic recognition process comprises a state corresponding to an acoustic model for garbage.

In one embodiment, the plurality of states include one or more initial states, and wherein a score of the one or more initial states is reset on each frame if the score is less than a threshold.

In one embodiment, the score is reset to a predetermined value on each frame if the score is less than a threshold before calculating a current score for the initial state based on a received acoustic unit for a current frame.

In one embodiment, said predetermined value is a constant.

In one embodiment, different initial states are reset to different predetermined values.

In one embodiment, the score comprises a first component indicating a probability of a match between a particular state and a received acoustic unit of the acoustic input signal, a second component comprising a highest score of a predecessor state, and a third component comprising an offset.

In one embodiment, the score comprises an offset to increase the score of each state so that scores of different durations are comparable.

In one embodiment, the offset is a constant greater than one.

In one embodiment, different states have different associated offset values.

In one embodiment, the plurality of states include one or more final states, and wherein a result is generated when a score of a final state increases above a threshold.

In one embodiment, the present invention includes a method comprising receiving, in a processor, an acoustic input signal and processing the acoustic input signal with a plurality of acoustic recognition processes configured to recognize the same target sound, the plurality of acoustic recognition processes comprising a Viterbi search of a plurality of states corresponding to acoustic units of an acoustic model, the plurality of states including initial states and final states of the acoustic model, wherein initial states are reset on each time steps if a score for the initial state on a previous time step is below a threshold, said score is calculated for a plurality of said states on each time step, said score comprising an offset to increase the score of each state so that scores of different durations are comparable, and a result is generated when a score of a final state increases above a threshold.

In one embodiment, the present invention includes a computer readable medium embodying a computer program for performing a method, said method comprising receiving an acoustic input signal and processing the acoustic input signal with a plurality of acoustic recognition processes configured to recognize the same target sound, wherein different acoustic recognition processes start processing different segments of the acoustic input signal at different time points in the acoustic input signal.

In one embodiment, each acoustic recognition process comprises a plurality of states corresponding to acoustic units, each state having an associated score.

In one embodiment, the plurality of states include one or more initial states, and wherein a score of the initial states is reset to on each frame if the score is less than a threshold.

In one embodiment, the score comprises an offset to increase the score of each state so that scores of different durations are comparable.

In one embodiment, the plurality of states include one or more final states, and wherein a result is generated when a score of a final state increases above a threshold.

In one embodiment, the present invention includes a computer system comprising one or more processors, each processor configured to receive an acoustic input signal and process the acoustic input signal with a plurality of acoustic recognition processes configured to recognize the same target sound, wherein different acoustic recognition processes start processing different segments of the acoustic input signal at different time points in the acoustic input signal.

The following detailed description and accompanying drawings provide a better understanding of the nature and advantages of the present invention.

BRIEF DESCRIPTION OF THE DRAWINGS

FIG. 5 illustrates an example algorithm for implementing one embodiment of the present invention.

DETAILED DESCRIPTION

Described herein are techniques for acoustic recognition. The apparatuses, methods, and techniques described below may be implemented as hardware, as a computer program (software) executing on one or more general purpose computers, or as a combination of hardware and software. For example, the methods and techniques described herein may be implemented on a system including one or more processors (e.g., a microprocessor, microcontroller), which may be general purpose processors or applications specific processors, for example. The computer program may further be stored on a computer readable storage medium. The computer readable storage medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
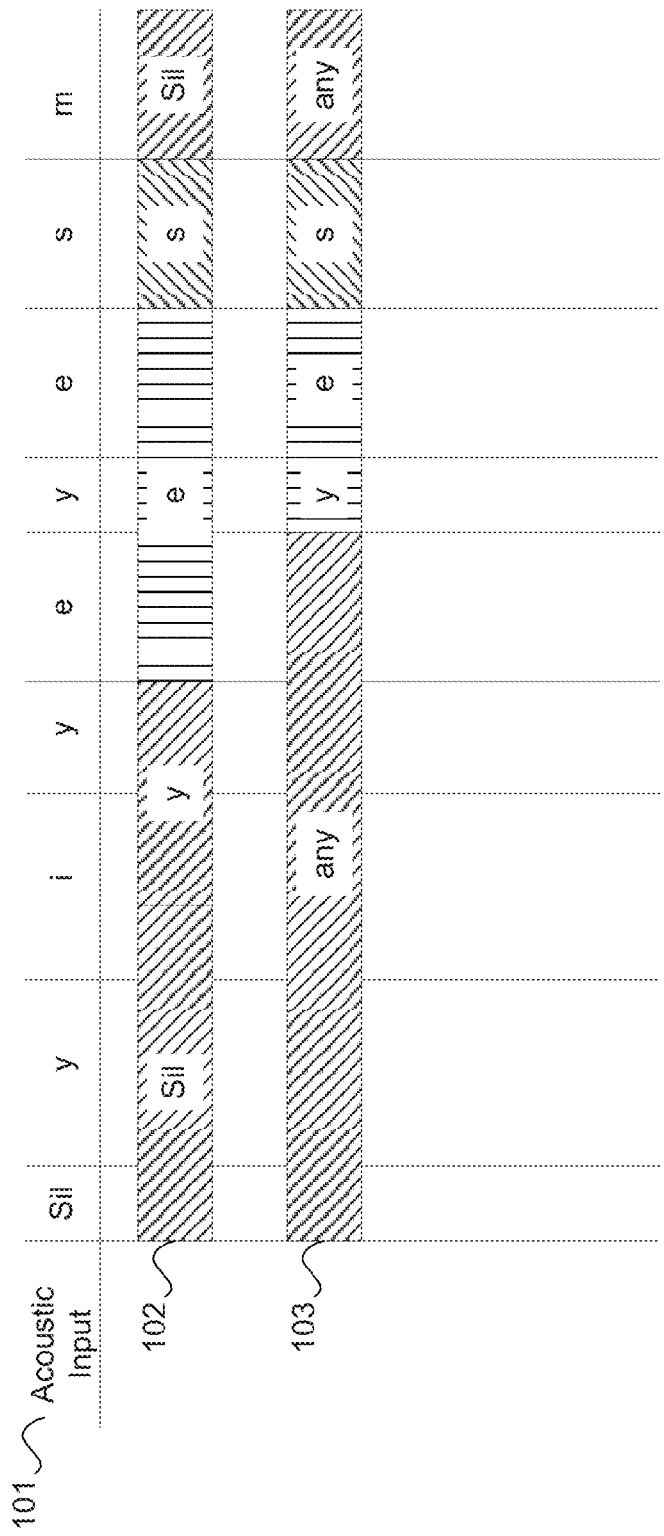
FIG. 1 illustrates prior art approaches to speech recognition.
Figure 2:
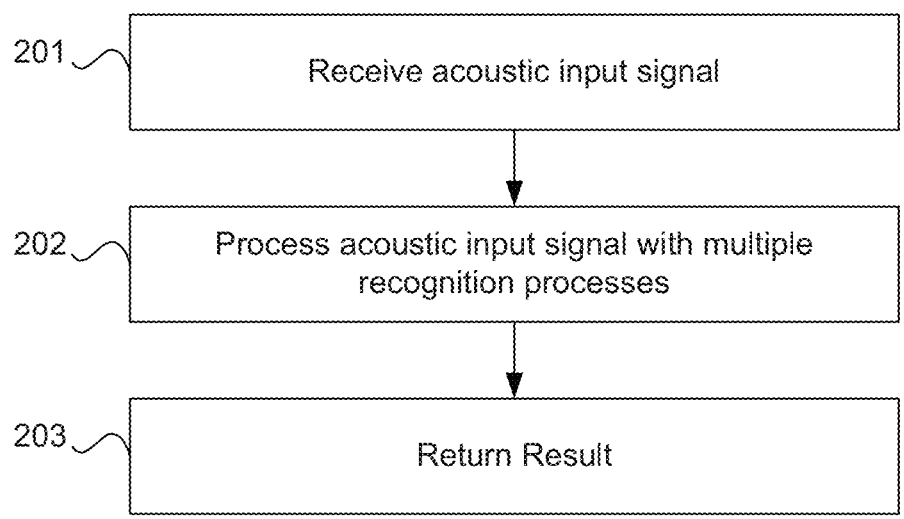
FIG. 2 illustrates a method according to one embodiment of the present invention.

FIG. 2 illustrates a method according to one embodiment of the present invention. Features and advantages of the present invention include, but are not limited to, processing segments of an acoustic input signal at different time points in the acoustic input signal. For example, at 201, an acoustic input signal is received. The acoustic input signal may be a discrete time signal or a continuous time signal. A continuous time signal may be converted to a discrete time signal for processing using an analog-to-digital converter, for example. The acoustic signal may be spoken words or phrases or other types of sounds. At 202, the acoustic input signal is processed with a plurality of acoustic recognition processes configured to recognize the same target sound. For example, each recognition process may be configured to recognize the word "yes". In one embodiment, different acoustic recognition processes start processing different segments of the acoustic input signal at different time points in the acoustic input signal. For example, a first acoustic recognition process may start processing an initial segment of the acoustic input signal from the beginning of the signal to a first time point later in the signal, a second acoustic recognition process may start processing another segment of the acoustic input signal from a second time point after the beginning of the signal to third time point in the signal, and a third acoustic recognition process may start processing another segment of the acoustic input signal from a fourth time point after the second time point to fifth time point in the signal, and so on. In one embodiment, the starting points of the plurality of recognition processes are staggered. For example, the first recognition process may start at the beginning of the acoustic input signal and successive recognition processes may start on successive time steps. Time steps may be regularly occurring time intervals within the system, which may be driven by a clock or other timing reference, for example, in which case they may also be of equal duration. Time steps may be used synonymously herein with the term "frame", which is a unit of speech processing for the system. Different systems may use different time steps/frames for performing processing. At 203 a recognition result is returned. As illustrated by one example implementation below, the different recognition processes starting at different times may be part of a single higher level process as part of a speech recognition engine, for example.

Figure 3:
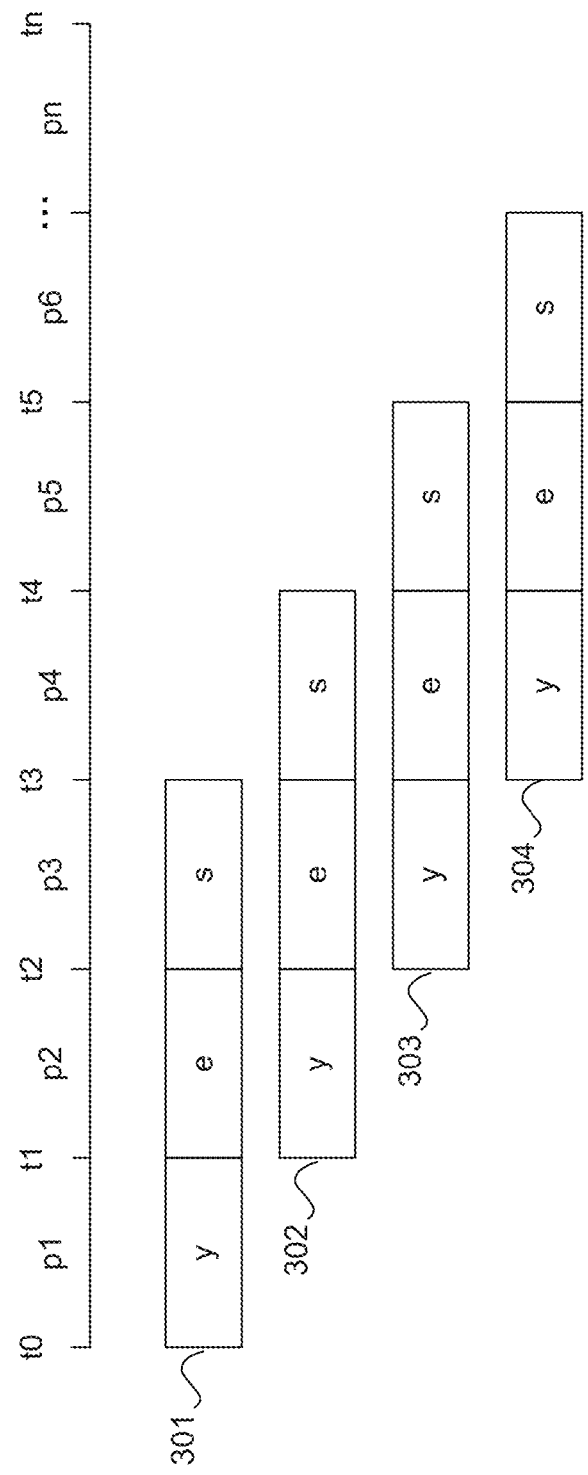
FIG. 3 illustrates speech recognition according to one embodiment of the present invention.

FIG. 3 illustrates speech recognition according to one embodiment of the present invention. In FIG. 3, acoustic units, p1-pn, of the received acoustic input signal may be received at time steps t0 to tn, where tn is an arbitrary number of time steps after t0. Acoustic units are a set of basic distinct units of speech sound by which, for example, morphemes, words, and sentences are represented. Acoustic units of the acoustic input signal are components of the received acoustic input signal, such as phonemes or subphones, for example. In this example, for illustration purposes, one acoustic unit is received on each time step. Additionally, in this example, a recognition process is starting on each time step. For example, a recognition process 301 configured to recognize the target word "yes" may be started at time step t0. Accordingly, in this illustrative example, received acoustic unit "p1" may be processed by a first portion of recognition process 301 (e.g., to recognize the "y" sound). As time progresses, additional recognition processes may be started to recognize the same target word—e.g., "yes". For instance, at time step t1, a second recognition process 302 may be started. The received acoustic unit "p2" may be processed by a first portion of recognition process 302. Further, depending on the result of processing acoustic unit "p1", recognition process 301 may also process acoustic unit "p2" in parallel with recognition process 303. However, if acoustic unit "p1" was not recognized by recognition process 301 (or had a low score), recognition process 301 may end in some cases. At time step t2, a third recognition process 303 may be started. The received acoustic unit "p3" may be processed by a first portion of recognition process 303. Further, depending on the results of processing acoustic units "p1" and "p2", recognition processes 301 or 302, or both, may also process acoustic unit "p3" in parallel with recognition process 303. Recognition processes may further be started at each successive time step, for example. Accordingly, if the sounds "y"-"e"-"s" appear starting at time step t1, recognition process 302 will capture the sounds. However, if the sounds "y"-"e"-"s" appear starting at time step t3, then recognition process 304 will capture the sounds more accurately than the other recognition processes. The above example is illustrative, and it is to be understood that in other embodiments acoustic units may be processed across multiple time steps, for example. Additionally, since time steps may be arbitrarily small, it is to be understood that multiple time steps may occur between the start of each recognition process. Further, the number of time steps between starting a recognition process may not be the same in all cases. Moreover, as illustrated below, it is to be understood that in some embodiments the recognition processes may not be of the same duration. Different recognition processes may span different numbers of time steps depending, for example, on the acoustic units received by the particular recognition process.

Figure 4:
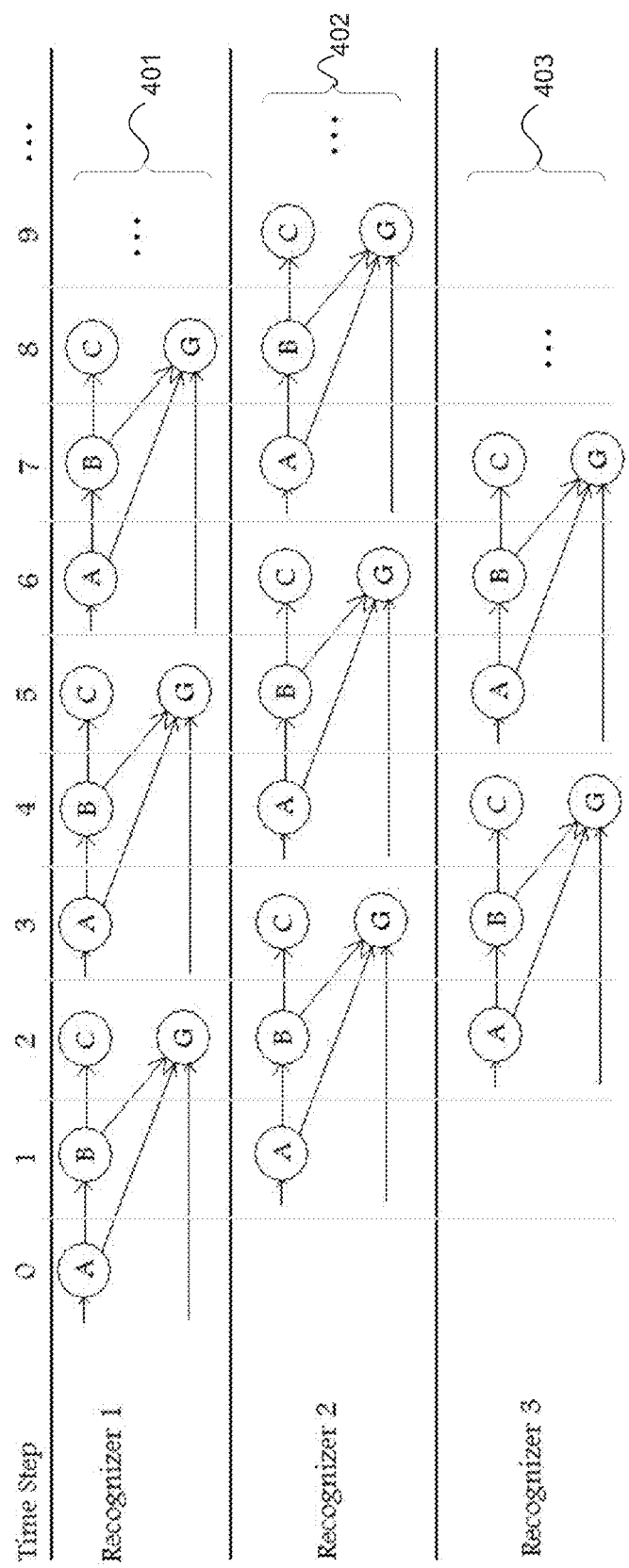
FIG. 4 is another illustrative example of a word spotting speech recognition system according to an embodiment of the present invention.

FIG. 4 is another illustrative example of a word spotting speech recognition system according to an embodiment of the present invention. One way to understand the word spotting techniques disclosed herein is to consider simpler problems and build the algorithms up to handling more complicated ones. One simple problem is to spot a single word, which has a single pronunciation and no recurrent transitions (i.e., the duration for each state is always 1). On each time step, there is a probability that the word is starting. If the word is three states long and it starts at time step t, then it will deterministically end on time step t+2. To do word spotting, the algorithm may consider the possibility of the word starting on each time step. Conceptually, this is equivalent to running three recognition processes in a staggered fashion, as shown in FIG. 4. While the present disclosure refers to multiple recognition processes (or "recognizers" in FIG. 4), it is to be understood that a single recognition process may include multiple components (e.g., states as described below) associated with different recognition processes, which in such a case are recognition sub-processes, for example.

FIG. 4 illustrates three different recognizers 401, 402, and 403. Each of these recognizers may include an acoustic model (or grammar) comprising phonemes A, B, and C, and a garbage node, node G. Garbage node, G, refers to an acoustic model of the background or all other sounds. Acoustic models for A, B, C, and G model different sounds. The states corresponding to the acoustic models and relationships between the states (i.e., the connection between the states) is referred to as a grammar. Several states may refer to the same acoustic model. Received acoustic units, in this case phonemes, are processed to determine if there is a match with the particular phonemes in the acoustic model. In this example, at the end of the three time steps allotted to each instance of a recognizer, the probabilities of being in nodes C and G are compared, and if the probability of being in node C is greater, then a recognition is returned. Here, node A is an initial node, and node G may also be an initial node. In some instances, there may be no reason to assume a priori that the first phoneme heard is A, so the initial transition to garbage may represent the probability that the first phoneme heard is not A.

The recognizers may be staggered so that one recognizer starts listening for a received word of interest on every time step, for example. Similarly, on every step after the first two time steps, a recognizer may check to see if a word ended on that time step. Accordingly, in this implementation, no possibilities are left unconsidered, and a word cannot sneak past the recognizer unnoticed. If the word of interest is received, a recognizer starts at approximately the same moment as the word is begun, and determines whether the word outscored garbage at the end of the recognition process, for example. The accuracy of the word spotting algorithm is thus only limited by the accuracy of the recognizer.

FIG. 5 illustrates an example algorithm for implementing one embodiment of the present invention. For example, the plurality of acoustic recognition processes mentioned above may comprise a Viterbi search of a plurality of states corresponding to acoustic units of an acoustic model. The plurality of states may include initial states of the acoustic model, and the initial states may be reset on successive time steps if a score for the initial state on a previous time step is below a threshold. A recognition result may be selected from a best path from an initial state to a final state. In this example, states "s" that are elements of "S" (e.g., all states) are assigned an associated score "δ" at each time step t. Referring to FIG. 4, at time step t=4, state A is an initial state and states B, C, D, and G have associated scores, for example. At 501, the initial score for all states at time step t=0 may be initialized to a minimum value (e.g., −∞). At 502, the process iterates across each time step from t=0 to N−1, where N is an integer and N−1 represents the last time step. At 503, on each time step, the process iterates across each initial state "i" in the set of all initial states "I" and checks the score of each initial state "i". At this point, the score of the initial state is the score on the previous time step (or the initialized score −∞). At 504, if the initial score "δ" of any initial state "i" on any time step "t" on each time step is less than a predetermined threshold value P, then the score for the initial state on that time step is reset to a predetermined value. In this case, the predetermined value is the threshold value P. Further, in this example, each initial state may have a different threshold value, Pi, and on each time step the score of each initial state may be compared against an associated minimum threshold value Pi for the particular initial state. The associated minimum threshold value, P, may be a prior probability for each state. For example, at any point in time, there may be a finite probability that the sound "y" is received. Thus, for an initial state configured to recognize the "y" sound, the associated P is the probability that the sound "y" is received on any time step. In some embodiments, a single value of P may be used for all initial states, and in other embodiments different initial states may have different associated values of Pi.

Referring to FIG. 4, on the first time step t=0 all the states A, B, C, and G are set to minus infinity at 501. At 503, the initial states A and G are set to an associated minimum threshold values Pi. Accordingly, initial states have a score that is greater than or equal to Pi. If an initial state scores poorly while processing a received acoustic unit on a particular time step, the initial state is reset on the next time step. Resetting the initial states of the model on each time step is one example implementation of starting different acoustic recognition processes for processing different segments of the acoustic input signal at different time points in the acoustic input signal. The simplified example in FIG. 4 has only two initial states, states A and G. However, other models may have more initials states.

At 505, on each time step, the process iterates across each state "s" in the set of all states "S" as follows. First, the process may calculate a score "δ" for each state "s", including initial states and final states, for time step "t" at 506. In this example, the score includes multiple components. As mentioned above, each state may model an acoustic unit of sound. At each time step, each state may analyze a received acoustic unit (e.g., a phoneme) against the acoustic unit the state is configured to recognize (e.g., a state may analyze a received acoustic unit of a "y" sound against a state configured to recognize a "y" sound). In this example, a probability "p" is generated for each state "s" at each time step "t". Probability "p" is the probability that an acoustic unit received at time step "t" matched state "s" (e.g., that state "s" heard what it was listening for). In this example, the logarithm of the probability "p" is calculated ("Log($p_{t,s}$))", herein "Log(p)"). Log(p) is a first component of the score.

In this example, the Log(p) component is added to a score of the highest scoring predecessor state that can transition into a current state (i.e., "max(x)" in FIG. 5). In FIG. 5, s' are predecessor states and Ts is the set of states that can transition into state "s". Thus, "max" is the largest score on the previous time step (t−1) of the predecessor state s' that can transition into state "s". In the example of FIG. 4, state A is an initial state, so Ta is {A} because, as described in more detail below, a state may transition into itself (e.g., in cases where the duration of a particular acoustic unit spans multiple time steps). For state B, Tb is {A, B} because state A can transition into state B and state B can transition into itself. For garbage node G, Tg is {A, B, G} and garbage is also an initial node. Thus, for state B, the "max(x)" component may return A (if A outscored B on the previous time step) or B (if B outscored A on the previous time step). The above description is an example of a Viterbi search.

For instance, in the case where A, B, C are configured to recognize Y, E, S, then the process may occur as follows. On a particular time step, the "y" sound may be received. State A will score high, and state B will score low. Thus, on the next time step, when the "e" sound is received, the score of state B for the current time step is added to the score for state A on the previous time step because, on the previous time step, the score for state A was greater than the score for state B, where Tb={A, B} and "max(x)" returned the score for A. On subsequent time steps, the combination of the high score for the previous state A and the current state B will outscore a combination of a previous state B score and current state B score. Thus, the transition of A-B outscores the self transition for B-B.

In one implementation, the present invention may further include a third component, "G", for the score of each state, at 506. One problem for many recognition systems is how the system recognizes words that may be spoken with different durations. For example, the word "YES" may be spoken quickly as "y"-"e"-"s", or one or more of the sounds may be extended in duration (e.g., "y"-"y"-"e"-"s"-"s"). However, scoring received acoustic units across different durations can be problematic. For example, adding scores may cause the aggregate score for a state to become smaller. Specifically, if scores are log probabilities, then the scores are negative and become more negative if they are added. Accordingly, recognition of longer duration sounds will score more poorly than recognition of shorter duration sounds. In this example, an offset is added to the score on each time step in order to compare scores of different durations. The offset makes the scores comparable. As described more in the examples below, the scores of final states may be compared against each other or compared against the same threshold to determine a result. In this case, comparison of scores for sounds of different durations is advantageous. In one embodiment, the third component of the score "δ" for each state "s" for time step "t" is a constant G. The constant G may provide an offset that is added to each score on each time step. In the embodiment illustrated in FIG. 5 at 506, a different value for G may be associated with different states ("Gs"). Accordingly, the total offset that is accrued for a path becomes dependent on the length of the path. If a path is 10 frames (time steps) in duration, the score for a state in the path traversing 10 states has a score that includes 10×G offset. If another path is 20 frames (time steps) in duration, then the score for a state in such path traversing 20 states has a score that includes 20×G offset. Without the offset, the longer path would have a much lower score. However, using G or Gs, both paths may have the same score if all other parameters are the same. In one example implementation using scores based on log probabilities, the values of G or Gs are greater than zero.

Referring again to FIG. 5, at 507 the highest scoring predecessor state that can transition into a current state "s" at time "t" is stored. In the pseudo code of FIG. 5, the "argmax" function is used to return s', the highest scoring predecessor state at time "t". The highest scoring predecessor states for each current state in an acoustic model may be stored as an array or vector of states for example. In this example, the two-dimensional variable $f_{t,s}$ (where state "s" is "from" at time "t") stores the highest scoring predecessor states for each state at each time step. This information can be used to trace back how the recognizers moved from state to state as the acoustic units were received. Accordingly, the process stores the history of transitions between states to determine the path through the states that led to a final state. The process may trace back through the stored best transition states (highest scoring predecessor states) to determine a best path.

At 508, the process may check for final states satisfying a particular condition and generate a result. For example, at 509, the process determines if any current states are final states. Some embodiments of the present invention may generate a result for final states if the score of the final state is above a threshold value. In this example, if the score of a final state exceeds zero ("0") at 509, then a result is generated. In this example implementation, if a final state, F, (s element of F) has a score greater than zero, then a "result" variable stores the final state having the highest score at 510. Referring to FIG. 4, "result" at 510 is the final state having a score greater than a threshold value (e.g., 0). At steps 511 and 512, the process iterates back through (traces back) the highest scoring predecessor states "f" previously stored at 507. Accordingly, an array variable (or vector) "result" may be used to store the states in the best path. The best path states and scores are returned as a result at 513.

It is to be understood that a word spotting system may perform the above techniques to simultaneously recognize multiple words. Accordingly, in FIGS. 4 and 5, the nodes A, B, C, and G could be used to recognize the word "YES" and another acoustic model having nodes X, Y, and G could be used to recognize the word "NO". Thus, the process may include multiple states for recognizing different words, including multiple initials states and multiple finals states for the different words, for example.

FURTHER EXAMPLE IMPLEMENTATIONS

Using a Single Recognizer Engine

Figure 6:
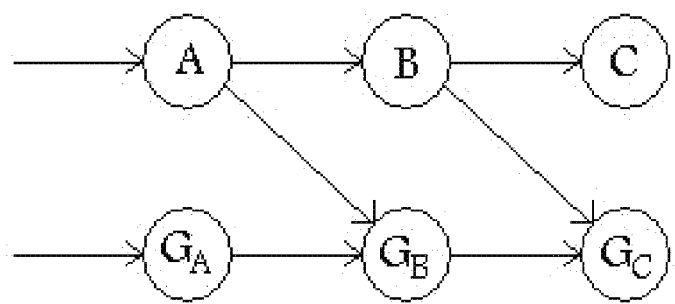
FIGS. 6-8 illustrates other example algorithms for implementing one embodiment of the present invention.

Implementation of the above algorithm may be too computationally expensive to be practical for some hardware devices. Fortunately, the algorithm can be accomplished much more efficiently. Some implementations may assume that each phoneme persists for exactly one time step. If we start a recognizer on time step 1, then only the A state is active on time step 1. On time step 2, the A state becomes inactive and only the B state is active, and on time step 3, only the C state is active. So we are only using one state of each recognizer at a time. Also notice that, except for garbage states, no two recognizers are in the same state at the same time. What all this means is that we can just use a single recognizer as illustrated in FIG. 6.

Unlike in the system of FIG. 4, the initial states of this recognizer now are to be restarted on every time step. Further, the probabilities may be scaled so that the largest probability is 1 (e.g. offsets may be added to each value so that the biggest value is 0 on a log scale). The recognizer may not need to know the actual probabilities, just the ratios between them, and these ratios are invariant to scaling, for example. When dealing with the log of these probabilities, the ratios become differences, and adding a constant to each log probability does not change the difference between any two of them.

However, if the constant is chosen so that the biggest log probability is a reasonable value (e.g., 0), then this prevents the values from underflowing whatever data type is used to hold them. In each of the staggered recognizers of FIG. 4, the only nodes competing are each node and its associated garbage node. In the single recognizer shown in FIG. 6, one of {A, Ga} should be zero, as should one of {B, Gb} and one of {C, Gc}. This is because we chose an offset to add to A and Ga such that the larger of them was 0. This means that the system do not need to remember a probability value for half the states. This will allow the system to get rid of garbage nodes later on.

Handling Recurrency

In FIG. 4, one algorithm was restricted to nodes which proceed in a feedforward manner and have duration 1. In the real world, it may be necessary to handle recurrent nodes in order to model variable length phonemes. Before doing this, though, nonrecurrent implementation of variable length phonemes is described.

Figure 7:
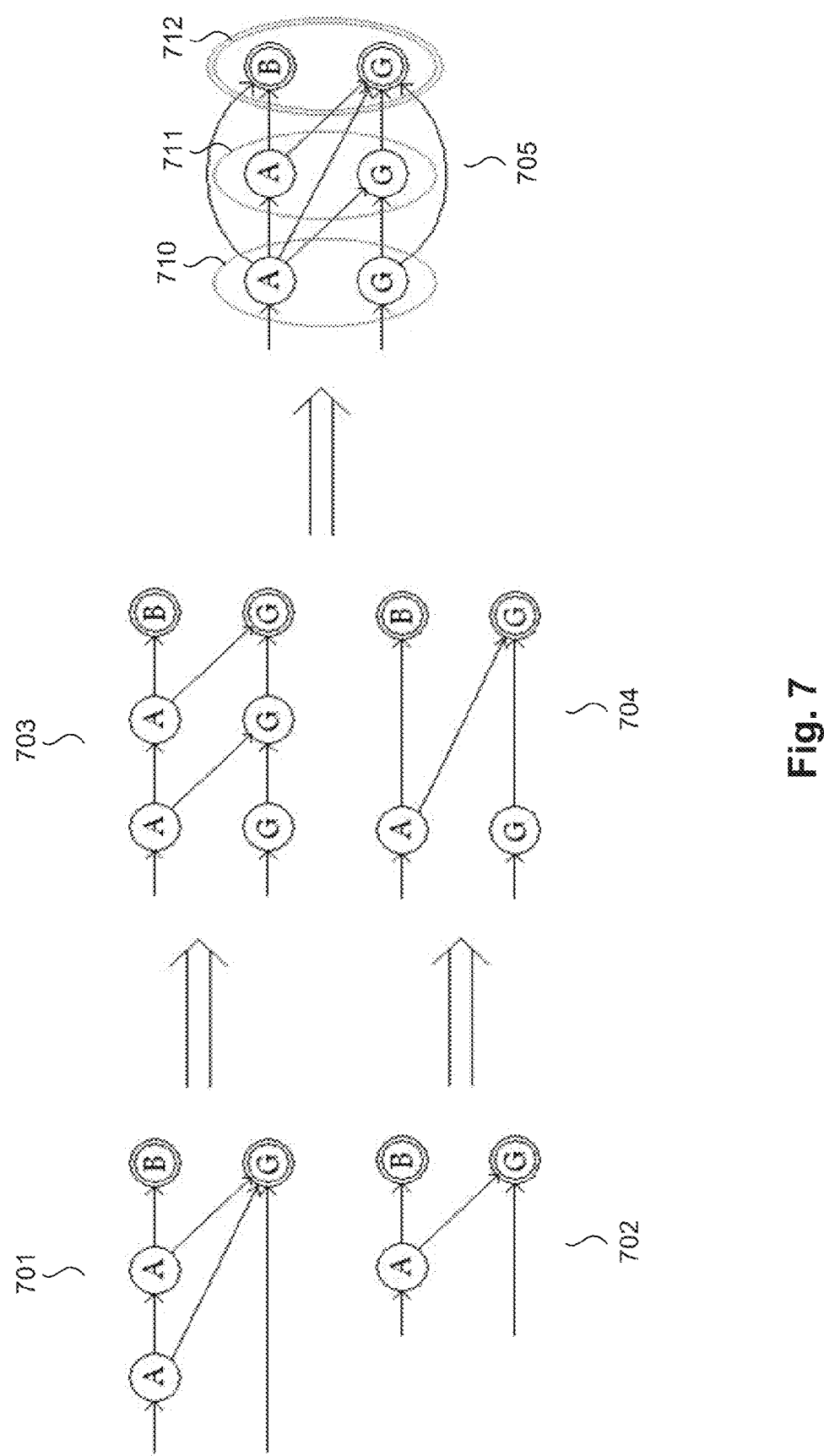

FIG. 7 illustrates variable length phoneme processing. Consider the leftmost two graphs 701 and 702. In the bottom graph 702 is the short version of the word AB, but in the top graph 701 the A state repeats once, giving AAB. In running the staggered version of the word spotter, a copy of both the short and the long graph may be restarted on each frame.

In the middle pair of graphs 703 and 704, each graph has been expanded to use a unique garbage state per time step. In the final graph 705 on the right, the two graphs 703 and 704 are combined. However, the transitions to garbage states remain linked with the transitions to the phonemes, and this is represented by the superstates 710-712. In the middle graphs 703-704, only two nodes are active in a staggered recognizer at any point in time: a phomene state and the garbage state directly beneath it. When the graphs are combined, this may be maintained. To see the potential problem, suppose that the system ran the rightmost recognizer 705 using restarts and normalizing each phoneme node with only the garbage state below it, and we ignored the superstates. It may be that on time step 3, the best path to B is AB, but the best path to the garbage state is AAB. If this is the case, then a proper garbage for AB must be less than the garbage for AAB (or AAB wouldn't be the best), so the garbage that the AB path is normalized against is artificially high. The normalized probability of AB is thus too low, causing possible missed words.

In one embodiment garbage state transitions stay in synch with phomene state transitions. If the blue superstates are numbered 1, 2, and 3, then if on time step 3 the best transition to B3 is from A1, then G3 will only consider coming from A1 and G1. In other words, if B3 comes from superstate 1, then G3 can only come from superstate 1. This maintains the vertical pairing of the original graphs and makes sure the normalization is correct.

Figure 8:
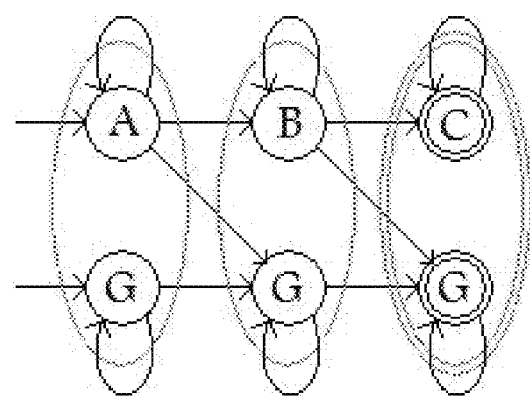

Bearing this in mind, we can now rewrite a graph with recurrent nodes as shown in FIG. 8.

Getting Rid of Garbage Nodes

The system may perform word spotting using approximately twice as much RAM and cycles as we would use to recognize the phrase in a non-wordspotting fashion. A last step in one example implementation of a word spotting algorithm is to get rid of garbage nodes so that word spotting can be done without the overhead in RAM or cycles. To do this, note that on each iteration, each superstate may be updated and then scale the phoneme and garbage nodes of each superstate back to reasonable values. As one example, the bigger of the two may be selected, and then this value is subtracted from both of them. The consequence is that at the end of each iteration, either the phoneme's score is zero or the garbage state's score is zero, and the nonzero one has a score that is less than zero.

One approach for eliminating the step just described is to change the normalization. Instead of making sure that the larger one is always zero, the system may normalizes so that the garbage value is always zero. Each time we update a superstate, calculate the new scores for the phoneme and its garbage state, and then subtract the garbage score from the phoneme score and save the result as the phoneme score. This allows the possibility of a positive score for a phoneme node, and when that happens in a final superstate, then the system knows that the phoneme has outscored its garbage node, and a word has been spotted. Also, when updating a superstate the system may assume that the garbage nodes in predecessor superstates have scores of zero, which makes the update easier.

As an example, the phrase spotting algorithm was run on a recording of a voice saying "oh yes sir" and the algorithm had to spot the word "yes". A program output showing one example implementation of a word spotting algorithm state at each time step has been include in Appendix 1. In the data, each state's "d" is the scaled log probability for that state. The stamp information tells when each phoneme was entered in its best history (which is what this implementation of the algorithm keeps track of), and what the score was when that phoneme was entered. On time step 26, the "d" value for state 0 becomes positive. This triggers a spotting of the word "yes" at that moment.

Figure 9:
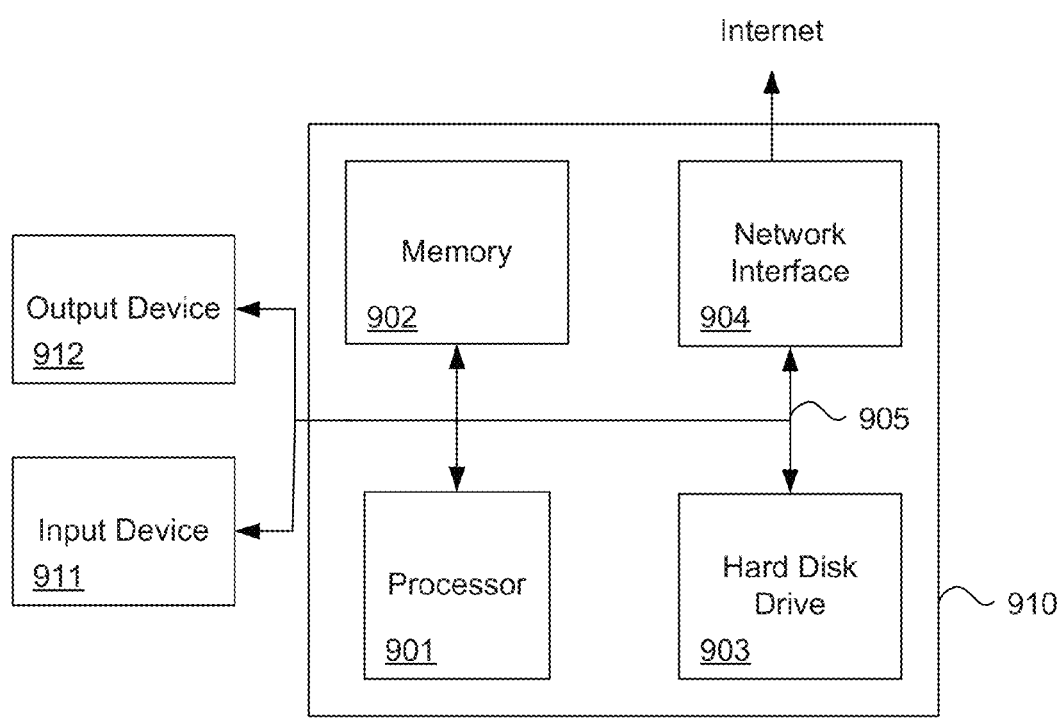
FIG. 9 illustrates an example hardware implementation of one embodiment of the present invention.

FIG. 9 shows a hardware implementation of one embodiment. In some applications, the techniques described above may be implemented on a computer system 910. Computer system 910 may include a desktop personal computer ("PC"), laptop PC, personal digital assistant ("PDA"), cellular phone, smart phone, or any of a number of different consumer electronic devices. Computer system 910 includes a processor 901 for executing instructions, which may include executing instructions for performing the techniques described above, for example. Processor 901 may be a microprocessor on a PC or server, for one example, or a microcontroller included in a consumer electronic product, as another example. Processor 901 may communicate with a memory 902, such as a random access memory ("RAM"), read only memory ("ROM"), or non-volatile memory for storing instructions to be executed, data to be processed, or intermediate data results, for example. Computer system 910 may include a hard disk drive 903 for storing large amounts of data or instructions, such as programs and operating system, for example. In some applications, non-volatile memories may be used for this purpose. Computer system 910 may include an input device 911 for receiving inputs from a user, such as speech inputs, touch screen inputs, keyboard inputs, or mouse inputs, for example. Output device 912 may be used to communicate outputs with the user, such as a display output (e.g., a visual screen), audio output (e.g., a speaker), or other forms of outputs. Computer system 910 may further include a network interface 904 for communicating information with other electronic devices. Network interface 904 may include a cellular radio, a wired network interface such as Ethernet or Digital Subscriber Line, a cable modem interface, or a wireless networking such as 802.11 or other wireless networking protocols, for example. Processor 901 may send and receive information to and from memory 902, hard disk drive 903, network interface 904, input device 911, or output device 912 over one or more data communication buses illustrated at 905. While one bus 905 is shown, it is to be understood that a variety of architectures may be used for transmitting digital information between components of an electronic system such as a computer system.

EXAMPLE APPLICATIONS

Speech recognizers using the above techniques can reside in a client consumer product, or in a variety of intermediary home or portable electronic products or on a remote server. Basically the more MIPS and memory, the better the recognition can perform. For unconstrained and more natural language voice interfaces, performance may be improved by performing on a server with more memory and a faster processor where the system performance can be very high and unconstrained. Applications of the above techniques may include using the above described wordspotting techniques with multiple words in parallel, with words in a serial fashion, with a combination of serial and parallel, or to define start time to capture audio to send to another recognition system. So for example, a user may say "Hello BlueGenie get me the weather in Sydney Australia" or "Hello BlueGenie get me the time in Port Orchard Oregon". The first trigger/wordspot is Hello BlueGenie (a single phrase). The second phrase group spots for "the time" and "the weather" and maybe other acoustic inputs (e.g. the recipe, the directions, etc.), for example. "Sydney Australia" and "Port Orchard Oregon" may be captured in audio and sent to a cloud recognizer requesting the weather/time in this location, for example. As another example, an application may have an "intelligent" lightswitch that not only listens for a handsfree trigger to turn lights on and off, but can also wirelessly send voice data through a home wi-fi to report back requested information. A user may say "Hey Lightswitch, lights off" or give a more complex phrase like "Hey Lightswitch, what's the weather in Boston Massachusettes?" The "standard" or simple commands for lighting control could be interpreted by the local lightswitch device, while other commands that are not easily understood could be passed to the server to decipher and send back a response to "What's the weather in Boston Massachusetts."

A server can work well for discrete and relatively unconstrained tasks. However, in some applications it may be burdensome to have a mass market consumer product utilize a server for handsfree voice trigger because this approach would use a lot of bandwidth. For example, imagine a "smart" lightswitch being sold to 250,000 people per year. It would thus require 250,000 ports or channels to be open analyzing speech data 24 hours a day, and the requirements would be rapidly growing with each new deployment.

Features and advantages of the present invention may include Client/Server Interaction for sharing speech recognition tasks. This includes, a client side embedded processor for speech recognition functions and may include an adaptive decision approach for determining what is recognized on the client versus what is recognized on the server. For example, the client may have pre-stored embedded commands, but usage patterns (frequency, error correction, sensor data, etc.) of use for server commands can cause modifications and downloads for new client data. In one embodiment, the present invention includes a hands free triggering application to allow a first embedded recognizer to access a second recognizer in a remote location, which may use the techniques described above.

Embodiments and applications of the above technology may be used for discrete "unconnected" consumer electronic products like the simple lightswitches, clocks, picture frames, cameras, televisions, and other consumer electronic devices, but also would work well with appliances that are internet or phone connected, yet lack the conventional keyboard and visual display historically required for user friendly controls.

As costs continue decreasing for WiFi and other wireless connectivity chips, a new generation of consumer products can emerge that use hands-free speech recognition to control and compressed speech files or text to speech synthesis to talk back or provide information. These technologies could exist standalone as a voice user interface (VUI), or in combination with displays or keyboards for a multi-modal user interface.

The speech functions described above could exist on a standalone IC, or embedded as software to run on the WIFI chip or other embedded controller. The embedded speech capabilities could include the handsfree trigger, discrete and common control functions (e.g. light on, what time is it, etc.), or could recognize commands to determine where data should be sent and for what purpose. For example (continuing with the intelligent lightswitch example), a user could say "Hey Lightswitch, Find Exchange rates" then it could recognize that command locally, and respond with "What would you like to convert?" and then send the next thing it hears to a dedicated speech server that can recognize and respond to currency conversion requests. If a user says "Hey Lightswitch, Find Weather" it could respond with "where would you like to know the weather?" and then take the following data into a specialized speech weather server capable of recognizing any cities, countries area codes or dialoguing on such topics as "extended weather" or "chances of rain" or other recognition activities involving weather. The client device could have a discrete list of commands so it knows what to send where, for example:

Lights off/on or Lights high/medium/low local command and control

Weather, Exchange Rates, Movies, Stock Quotes, Market Update, Recipes, World Time, Music, Photographs, or other commands that could be used for accessing specialized functions or data.

Commands could even be given for "social networking" that allows a server or PC-based dictation engine to directly blog onto Twitter or onto a user "what am I doing now" for Facebook.

Appliances could have built in "Help" commands with local recognition and synthesis providing basic help and "More Help" leading to a server based system that is more interactive and data rich.

Other connected devices that could use handsfree voice triggers and combined client/server recognition could include: clocks, radios, stereos, PDAs, iPod/iPhones, televisions, cable boxes, HVAC/thermostat, home security, picture frames, kitchen electronics (toaster, microwave, dishwasher, etc), white goods (refrigerator, washer, dryer, etc.).

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, the processes described above may be performed in real time as acoustic units are received or processed after the acoustic units have been received (e.g., in batch as with a delay). Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving an acoustic input signal that includes a plurality of spoken words or phrases; and
processing the acoustic input signal with a plurality of acoustic recognition processes to recognize a predetermined target sound within the acoustic input signal,
wherein the acoustic input signal is temporally divided into a plurality of frames,
wherein the plurality of acoustic recognition processes are implemented using a single Viterbi search of a plurality of states corresponding to acoustic units of an acoustic model of the predetermined target sound, the plurality of states including initial states and final states of the acoustic model, each initial state in the plurality of states being associated with successive frames in the plurality of frames,
wherein, at each frame, one or more of the plurality of acoustic recognition processes determine whether the predetermined target sound has been recognized, and
wherein a determination that the target sound has been recognized ends the processing of the acoustic input signal.

2. The method of claim 1 wherein each state in the plurality of states is associated with a score.

3. The method of claim 2 wherein the score comprises a first component indicating a probability of a match between a particular state and a received acoustic unit of the acoustic input signal, a second component comprising a highest score of a predecessor state, and a third component comprising an offset.

4. The method of claim 2 wherein calculating the score for each state comprises increasing the score by a per frame offset so that scores of different durations are comparable.

5. The method of claim 4 wherein the offset is a constant greater than one.

6. The method of claim 4 wherein different states have different associated offset values.

7. The method of claim 1 wherein the plurality of states include a state corresponding to an acoustic model for garbage.

8. The method of claim 1 wherein a score of each initial state is reset on each frame if the score is less than a threshold.

9. The method of claim 8 wherein the score of each initial state is reset to a predetermined value on each frame if the score is less than the threshold, before calculating a current score for the initial state based on a received acoustic unit for a current frame.

10. The method of claim 9 wherein said predetermined value is a constant.

11. The method of claim 9 wherein different initial states are reset to different predetermined values.

12. The method of claim 1 wherein the plurality of acoustic recognition processes operate on multiple words in parallel.

13. A non-transitory computer readable storage medium having stored thereon program code executable by a processor, said program code comprising:
- code that causes the processor to receive an acoustic input signal that includes a plurality of spoken words or phrases; and
- code that causes the processor to process the acoustic input signal with a plurality of acoustic recognition processes to recognize a predetermined target sound within the acoustic input signal,
- wherein the plurality of acoustic recognition processes are implemented using a single Viterbi search of a plurality of states corresponding to acoustic units of an acoustic model of the predetermined target sound, the plurality of states including initial states and final states of the acoustic model, each initial state in the plurality of states being associated with successive frames in the plurality of frames,
- wherein, at each frame, one or more of the plurality of acoustic recognition processes determine whether the predetermined target sound has been recognized, and
- wherein a determination that the target sound has been recognized ends the processing of the acoustic input signal.

14. The non-transitory computer readable storage medium of claim 13 wherein each state in the plurality of states is associated with a score.

15. The non-transitory computer readable storage medium of claim 14 wherein calculating the score for each state comprises increasing the score by a per frame offset so that scores of different durations are comparable.

16. The non-transitory computer readable storage medium of claim 13 wherein a score of each initial state is reset on each frame if the score is less than a threshold.

17. A computer system comprising:
- one or more processors, each processor configured to:
  - receive an acoustic input signal that includes a plurality of spoken words or phrases; and
  - process the acoustic input signal with a plurality of acoustic recognition processes to recognize a predetermined target sound within the acoustic input signal,
- wherein the plurality of acoustic recognition processes are implemented using a single Viterbi search of a plurality of states corresponding to acoustic units of an acoustic model of the predetermined target sound, the plurality of states including initial states and final states of the acoustic model, each initial state in the plurality of states being associated with successive frames in the plurality of frames,
- wherein, at each frame, one or more of the plurality of acoustic recognition processes determine whether the predetermined target sound has been recognized, and
- wherein a determination that the target sound has been recognized ends the processing of the acoustic input signal.

* * * * *